US009055589B2

(12) United States Patent
Deu-Ngoc et al.

(10) Patent No.: US 9,055,589 B2
(45) Date of Patent: Jun. 9, 2015

(54) METHODS AND APPARATUS FOR PRIORITIZING ASSIGNMENT OF A PACKET DATA SESSION FOR A PLURALITY OF APPLICATIONS OF A MOBILE COMMUNICATION DEVICE

(71) Applicant: Research In Motion Limited, Waterloo (CA)

(72) Inventors: Joseph Tu-Long Deu-Ngoc, Waterloo (CA); Jeffery William Wirtanen, Kanata (CA); Simon Cheuk Kong Ho, Markham (CA)

(73) Assignee: BlackBerry Limited, Waterloo, Ontario (CA)

( * ) Notice: Subject to any disclaimer, the term of this patent is extended or adjusted under 35 U.S.C. 154(b) by 291 days.

(21) Appl. No.: 13/771,595

(22) Filed: Feb. 20, 2013

(65) Prior Publication Data
US 2013/0163547 A1    Jun. 27, 2013

Related U.S. Application Data

(63) Continuation of application No. 12/346,111, filed on Dec. 30, 2008, now Pat. No. 8,402,165.

(60) Provisional application No. 61/051,915, filed on May 9, 2008.

(51) Int. Cl.
G06F 15/16        (2006.01)
H04W 76/06       (2009.01)
H04W 72/10       (2009.01)
H04W 76/02       (2009.01)

(52) U.S. Cl.
CPC ............ *H04W 76/066* (2013.01); *H04W 72/10* (2013.01); *H04W 76/025* (2013.01); *H04W 76/068* (2013.01)

(58) Field of Classification Search
CPC ............ H04W 72/006; H04W 76/025; H04W 76/068
USPC ......................................... 709/226, 228, 229
See application file for complete search history.

(56) References Cited

U.S. PATENT DOCUMENTS

| 6,104,929 | A | * | 8/2000 | Josse et al. ..................... 455/445 |
|---|---|---|---|---|
| 6,498,788 | B1 | * | 12/2002 | Emilsson et al. .............. 370/342 |
| 6,711,141 | B1 | * | 3/2004 | Rinne et al. ................... 370/328 |
| 6,742,023 | B1 | * | 5/2004 | Fanning et al. ................ 709/219 |
| 7,054,323 | B2 | * | 5/2006 | Viola et al. .................... 370/401 |
| 7,359,972 | B2 | * | 4/2008 | Jorgensen ...................... 709/226 |
| 7,764,784 | B2 | * | 7/2010 | Sewall ...................... 379/428.02 |
| 2003/0021274 | A1 | * | 1/2003 | Siikaniemi et al. ........... 370/392 |
| 2004/0040025 | A1 | * | 2/2004 | Lehtinen ....................... 718/104 |
| 2004/0100940 | A1 | * | 5/2004 | Kuure et al. ................... 370/349 |
| 2004/0205233 | A1 | * | 10/2004 | Dunk ............................ 709/238 |

(Continued)

Primary Examiner — Hieu Hoang
(74) Attorney, Agent, or Firm — Fleit Gibbons Gutman Bongini & Bianco P.L.

(57) ABSTRACT

A mobile device establishes with a wireless network a packet data session associated with a first application for accessing a first communication service, as well as a packet data session associated with a second application for accessing a second communication service. In response to identifying an indication of a request for information via a third application, the mobile device causes the packet data session associated with the second application to be terminated, and establishes with the wireless network a packet data session associated with the third application for accessing a third communication service.

18 Claims, 11 Drawing Sheets

(56) References Cited

U.S. PATENT DOCUMENTS

| | | | |
|---|---|---|---|
| 2005/0043032 A1* | 2/2005 | Choi | 455/450 |
| 2005/0064891 A1* | 3/2005 | Chaudry et al. | 455/527 |
| 2005/0101300 A1* | 5/2005 | Hon et al. | 455/412.1 |
| 2005/0128963 A1* | 6/2005 | Gazda et al. | 370/278 |
| 2005/0135255 A1* | 6/2005 | Drouet et al. | 370/237 |
| 2005/0243760 A1* | 11/2005 | Yoshioka | 370/328 |
| 2005/0254453 A1* | 11/2005 | Barneah | 370/328 |
| 2006/0251000 A1* | 11/2006 | Williams | 370/315 |
| 2007/0073805 A1* | 3/2007 | Jorgensen | 709/203 |
| 2007/0136372 A1* | 6/2007 | Proctor et al. | 707/104.1 |
| 2008/0089303 A1* | 4/2008 | Wirtanen et al. | 370/342 |
| 2008/0132268 A1* | 6/2008 | Choi-Grogan et al. | 455/550.1 |
| 2008/0132269 A1* | 6/2008 | Shen et al. | 455/550.1 |
| 2010/0220604 A1* | 9/2010 | Skog et al. | 370/252 |

* cited by examiner

FIG. 1
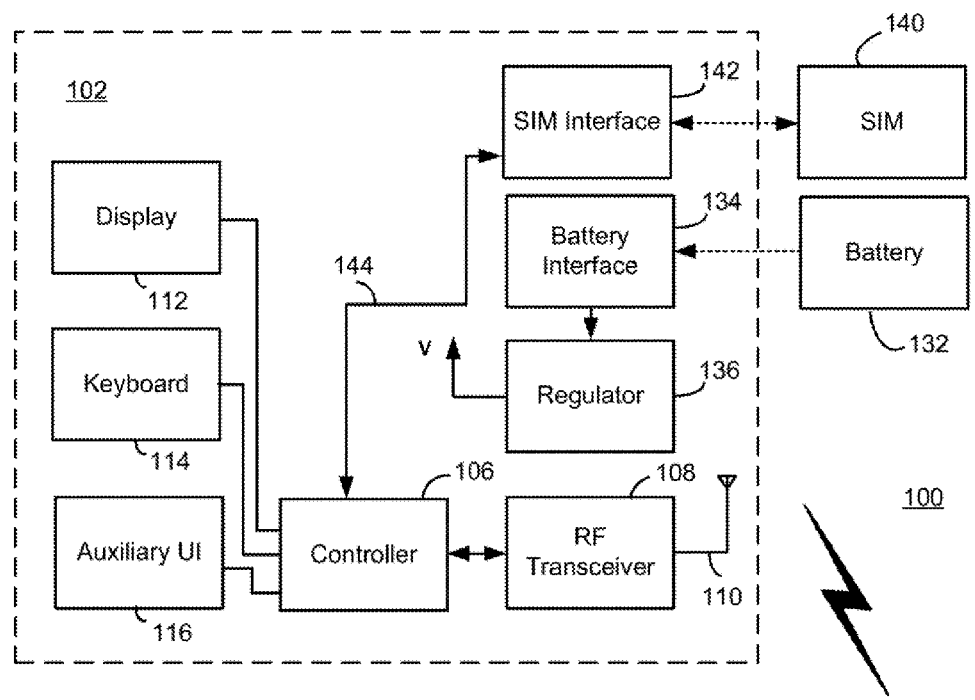
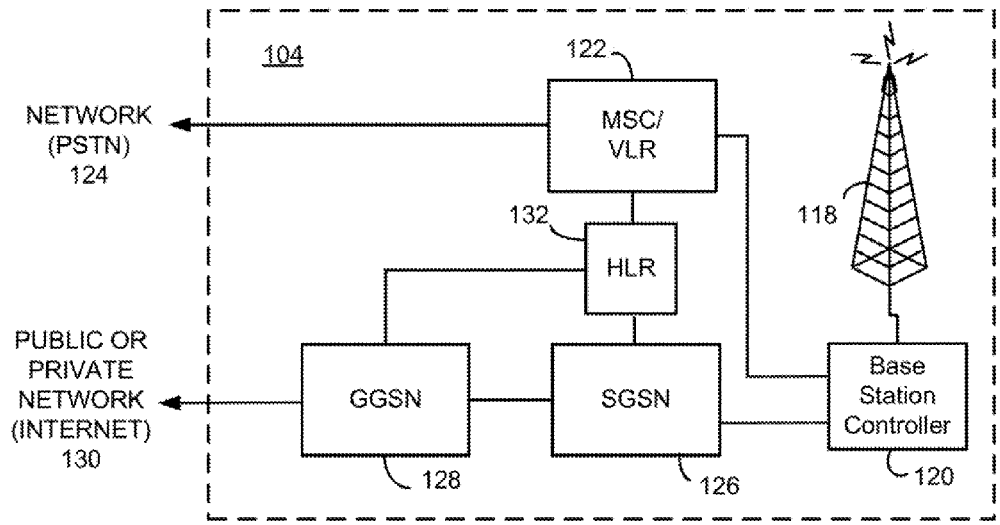

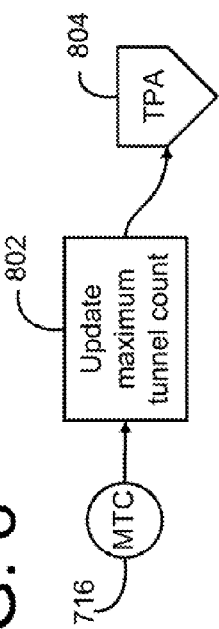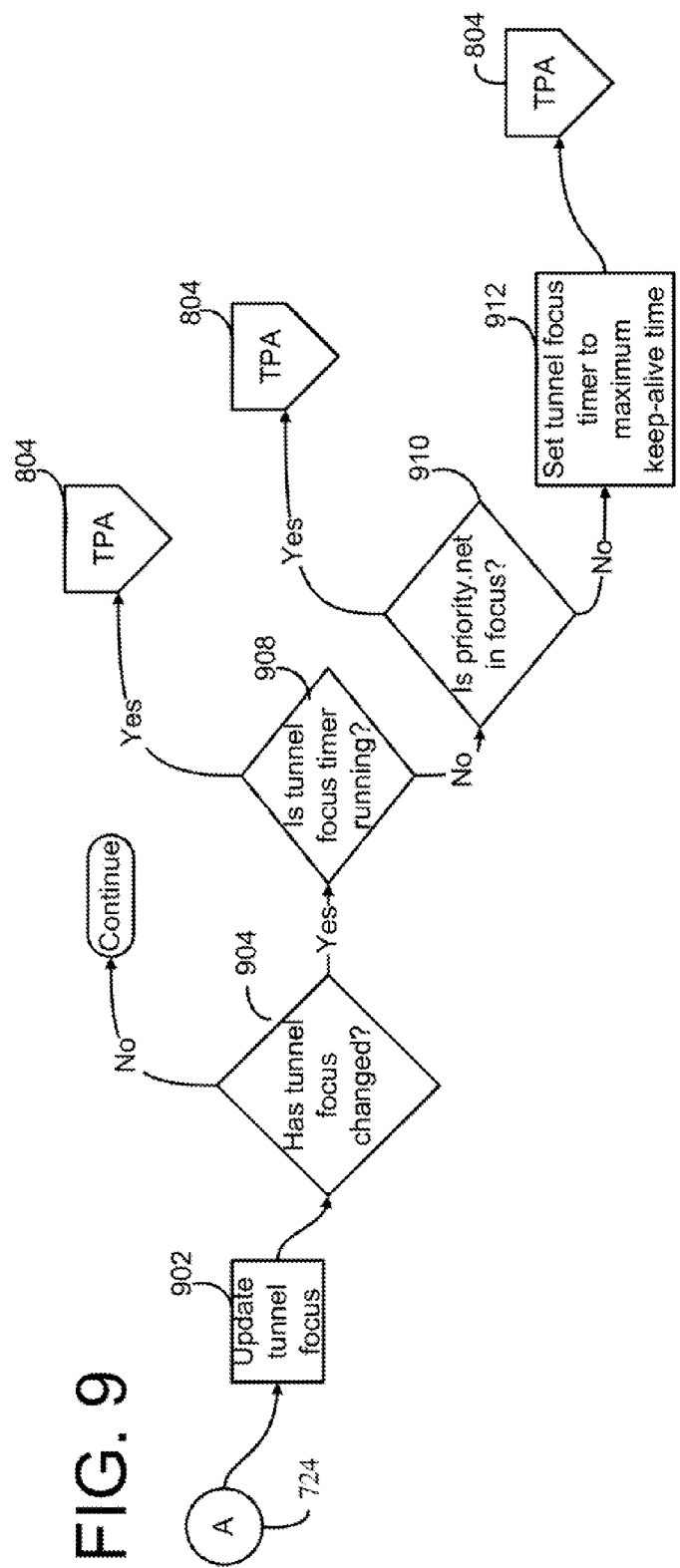
FIG. 8
FIG. 9

METHODS AND APPARATUS FOR PRIORITIZING ASSIGNMENT OF A PACKET DATA SESSION FOR A PLURALITY OF APPLICATIONS OF A MOBILE COMMUNICATION DEVICE

CROSS REFERENCE TO RELATED APPLICATIONS

This patent application is a continuation of and claims priority to U.S. non-provisional patent application having application Ser. No. 12/346,111 and filing date of 30 Dec. 2008, which claims priority to U.S. provisional patent application having application No. 61/051,915 and filing date of 9 May 2008, each application being hereby incorporated by reference herein.

BACKGROUND

1. Field of the Technology

The present disclosure relates generally to mobile communication devices operative in wireless communication networks, and more particularly to a mobile communication device which operates to prioritize assignment of a packet data session utilized for a plurality of applications of the mobile device, especially when operating in wireless networks that limit the number of simultaneous packet data sessions available to the mobile device.

2. Description of the Related Art

A mobile communication device (e.g. a mobile station or MS) may operate in a wireless communication network which provides for high-speed packet data communications. The mobile device may offer a number of different capabilities or features for a user. Many of these capabilities are defined by the different applications which are installed in the mobile device. The mobile device may have a voice telephony application, a data or message synchronization application (e.g. for e-mail messages or calendar items), a Web browser application, as examples. These applications operate in connection with different communication services provided in the wireless network.

When an application is initially invoked the mobile device causes the associated communication service to be activated in the wireless network. In particular, a packet data session needs to be established for each application or service. For wireless networks which employ a General Packet Radio Service (GPRS), the packet data session may be a Packet Data Protocol (PDP) context. Here, an Application Point Name (APN) is utilized to determine how the mobile device communicates via the wireless network to a host site.

However, wireless networks do not allow for an unlimited number of PDP contexts to be simultaneously maintained for a mobile device. It has been discovered that some wireless networks limit the number of simultaneous PDP contexts for a mobile device to a relatively small number. The wireless network may even limit the number of PDP contexts for a mobile device to a single PDP context. At the present time, 3$^{rd}$ Generation (3G) wireless networks appear to most clearly exhibit such characteristics, which may be due to network software options or upgrades not being configured as appropriate.

In such environment, if a "push-type" data or message synchronization application is the primary application of the mobile device, for example, but the PDP context for this application is deactivated through use of one or more other applications (e.g. the user of the mobile device invokes a Web browser application), there may be user confusion or undesirable operation in the mobile device.

What are needed are methods and apparatus to overcome these and related deficiencies of the prior art. The same or similar problems may exist in other networks and devices.

BRIEF DESCRIPTION OF THE DRAWINGS

Embodiments of present disclosure will now be described by way of example with reference to attached figures, wherein:

FIG. 1 is a block diagram which illustrates pertinent components of a mobile station and a wireless communication network;

FIGS. 7-12 form a flowchart for a more detailed method for use in prioritizing assignment of a packet data session/tunnel connection for the plurality of applications of the mobile device.

DETAILED DESCRIPTION OF THE PREFERRED EMBODIMENTS

Figure 2:
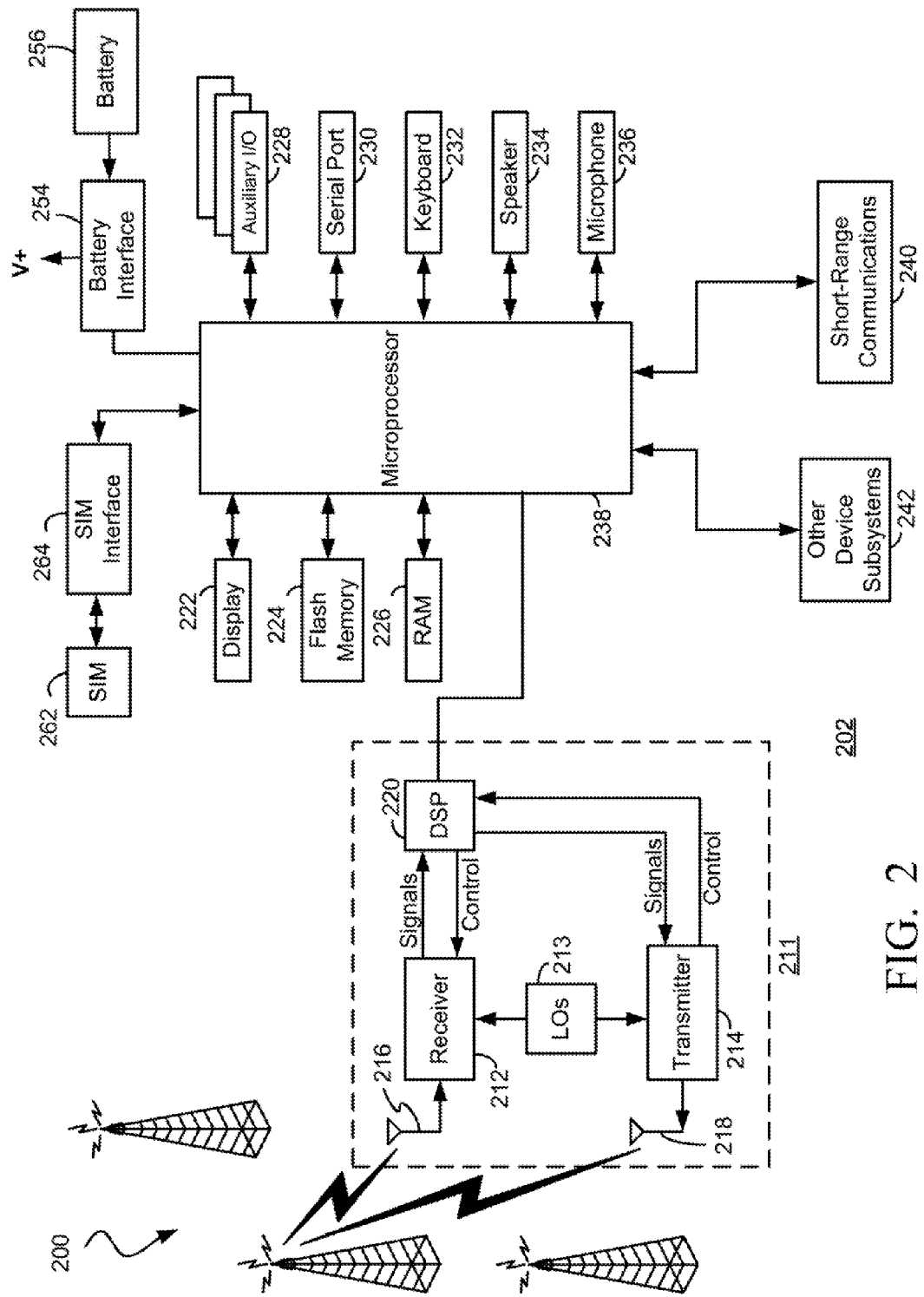
FIG. 2 is a more detailed diagram of a preferred mobile station of FIG. 1.

Methods and apparatus for prioritizing assignment of a packet data session for a plurality of applications of a mobile communication device, especially in wireless networks that limit the number of simultaneous packet data sessions available to the mobile device, are disclosed herein. The plurality of applications include at least a first (priority) application operative in connection with a first (priority) communication service and a second application operative in connection with a second communication service. The first (priority) service may be or include a "push" type data or message synchronization service. The mobile device causes a packet data session associated with the first (priority) application to be activated for accessing the first (priority) service. In response to identifying an indication of a request for information via the second application, the mobile device causes the packet data session associated with the first (priority) application to be deactivated, and causes a packet data session associated with the second application to be activated for accessing the second service. Subsequently, in response to identifying communication inactivity associated with the second application over a predetermined time period, the mobile device causes the packet data session associated with the second application to be deactivated, and causes a packet data session associated with the first (priority) application to be activated again with the wireless network for again accessing the first (priority) service. Thus, "pushed" information associated with the data or message synchronization service may be received without fail despite the use of other applications in the mobile device.

To illustrate exemplary system architecture, FIG. 1 shows a block diagram of a communication system 100 which includes a mobile station 102 (one example of a wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a tower station 118 and a base station controller (BSC) 120 (described later below), including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 includes a battery interface 134 for receiving one or more rechargeable batteries 138. Battery 138 electrical power to electrical circuitry in mobile station 102, and battery interface 134 provides for a mechanical and electrical connection for battery 132. Battery interface 134 is coupled to a regulator 136 which regulates power to the device. Mobile station 102 may be a handheld portable communication device, which includes a housing (e.g. a plastic housing) which carries and contains the electrical components of mobile station 102 including battery 138. Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Preferably, as mentioned earlier, mobile station 102 is a handheld portable communication device which includes a housing (e.g. a plastic housing) which carries and contains the electrical components of mobile station 102. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Today, such a mobile station may further operate in accordance with Enhanced Data rates for GSM Evolution (EDGE) or Enhanced GPRS (EGPRS), as described in the Background section. In such environment, wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks.

For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on algorithms, keys, and criteria (e.g. as in existing GSM). In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

FIG. 2 is a detailed block diagram of a preferred mobile station 202 of the present disclosure. Mobile station 202 is preferably a two-way communication device having at least voice and advanced data communication capabilities, including the capability to communicate with other computer systems Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. The communication techniques of the present disclosure may generally be controlled by microprocessor 238 in connection with DSP 220. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information. The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. These applications will be described later in relation to FIG. 5 below.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component which provides for communication between mobile station 202 and different systems or devices, which need not necessarily be similar devices.

Figure 3:
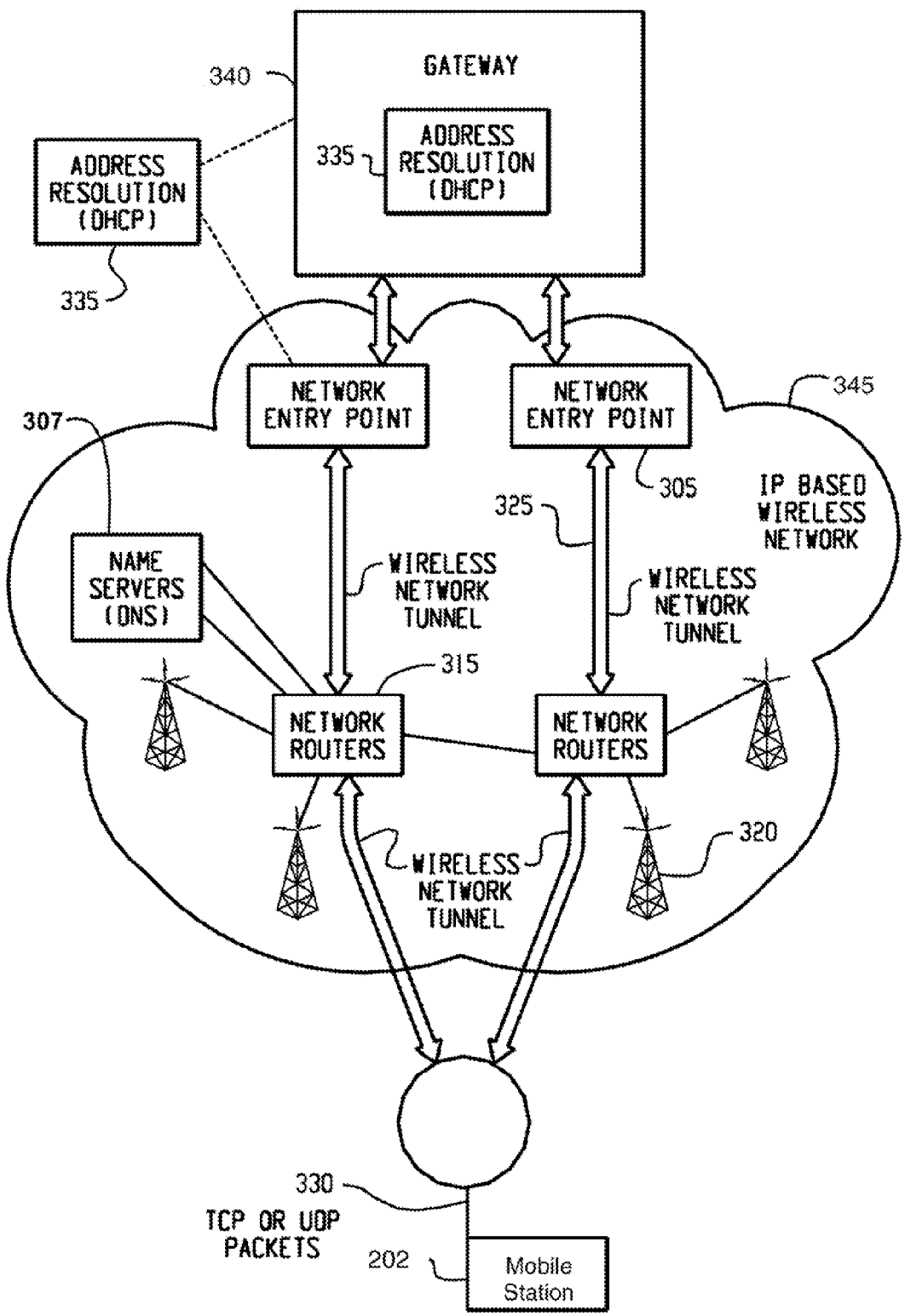
FIG. 3 is a particular system architecture for the mobile station and wireless network of FIGS. 1 and 2 for "pushed" data communications.

FIG. 3 shows a particular system structure for packet data communications with mobile station 202. In particular, FIG. 3 shows basic components of an IP-based wireless data network which may be utilized for "pushed" data communications. Mobile station 202 communicates with a wireless packet data network 345, and may also be capable of communicating with a wireless voice network (not shown). As shown in FIG. 3, a gateway 340 may be coupled to an internal or external address resolution component 335 and one or more network entry points 305. Data packets are transmitted from gateway 340, which is source of information to be transmitted to mobile station 202, through network 345 by setting up a wireless network tunnel 325 from gateway 340 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus preferable for mobile station 202 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile station 202.

Wireless network tunnels such as a wireless tunnel 325 are opened across wireless network 345 in order to allocate necessary memory, routing, and address resources to deliver IP packets. Such tunnels 325 are activated as part of what are referred to as Packet Data Protocol or "PDP contexts" (i.e. packet data sessions). To open wireless tunnel 325, mobile station 100 must use a specific technique associated with wireless network 345. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 202 and communicated to gateway 340, information can then be forwarded from gateway 340 to mobile station 202.

Note that wireless networks do not allow for an unlimited number of PDP contexts to be simultaneously maintained. In fact, it has been discovered that some wireless networks limit the number of simultaneous PDP contexts to a relatively small number (at least relative to the number of applications available in mobile station 202). It is even possible that the wireless network limits the number of PDP contexts for mobile station 202 to a single PDP context. At the present time, $3^{rd}$ Generation (3G) wireless networks appear to most clearly exhibit such characteristics, which may be due to network software options or upgrades not being configured as appropriate. If a "push-type" data or message synchronization application is the primary application of mobile station 202, but the PDP context for this application is deactivated through use of one or more other applications (e.g. the user of mobile station 202 invokes a Web browser application), there may be user confusion or undesirable operation in the mobile station 202.

Figure 4:
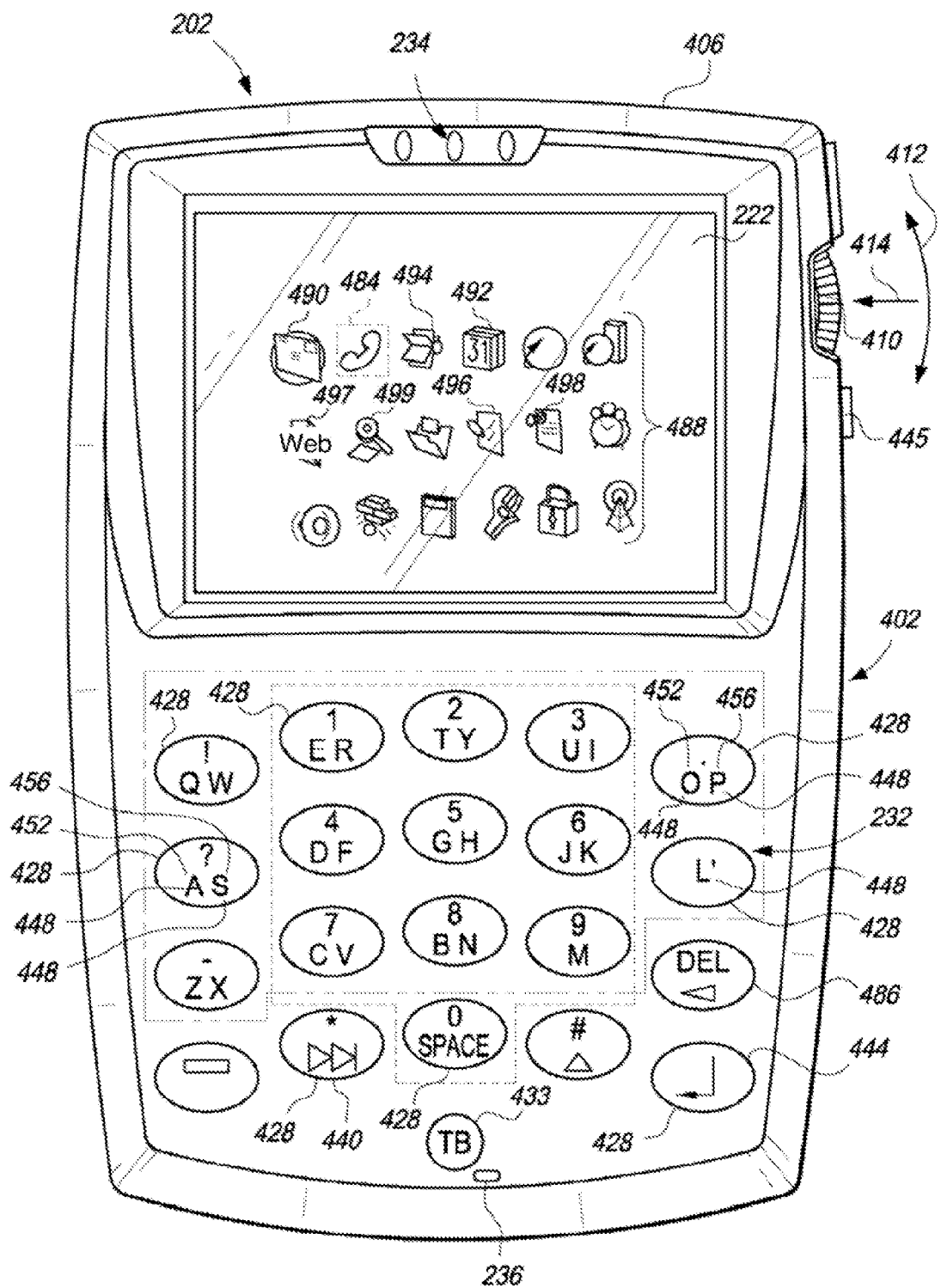
FIG. 4 is an illustrative example of an exemplary user interface of the mobile station of FIGS. 1 and 2.

Referring now to FIG. 4, what is shown is an illustrative representation of an exemplary user interface 402 of mobile station 202 of FIGS. 1 and 2 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile station 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DE> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
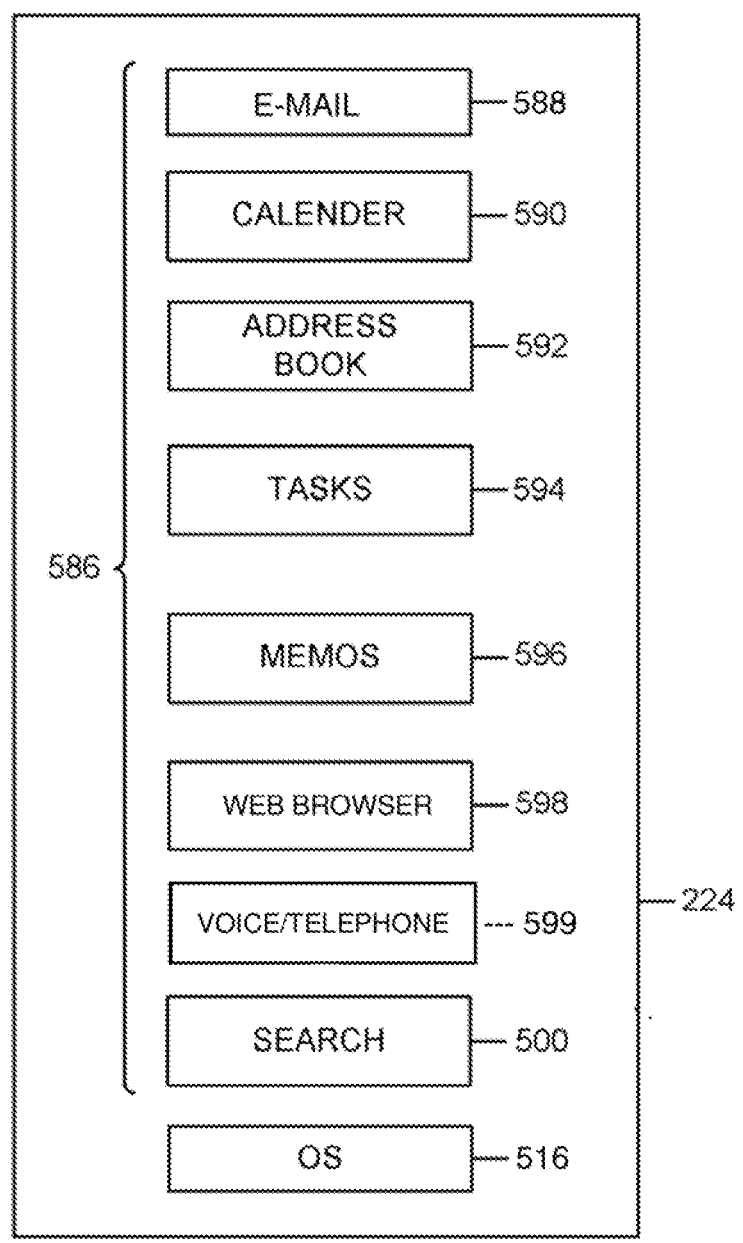
FIG. 5 is an illustrative representation of memory of the mobile station which has a plurality of applications stored therein.

As shown further in FIG. 5, memory 224 of mobile station 202 includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

In FIG. 4, the "home" screen output is shown as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile station 202 has just been described, any suitable mobile communication device or terminal may be part of the methods and apparatus which will be described in fuller detail below. Note that many components of mobile device 202 shown and described may not be included (e.g. a full QWERTY keypad may be optional).

Figure 6:
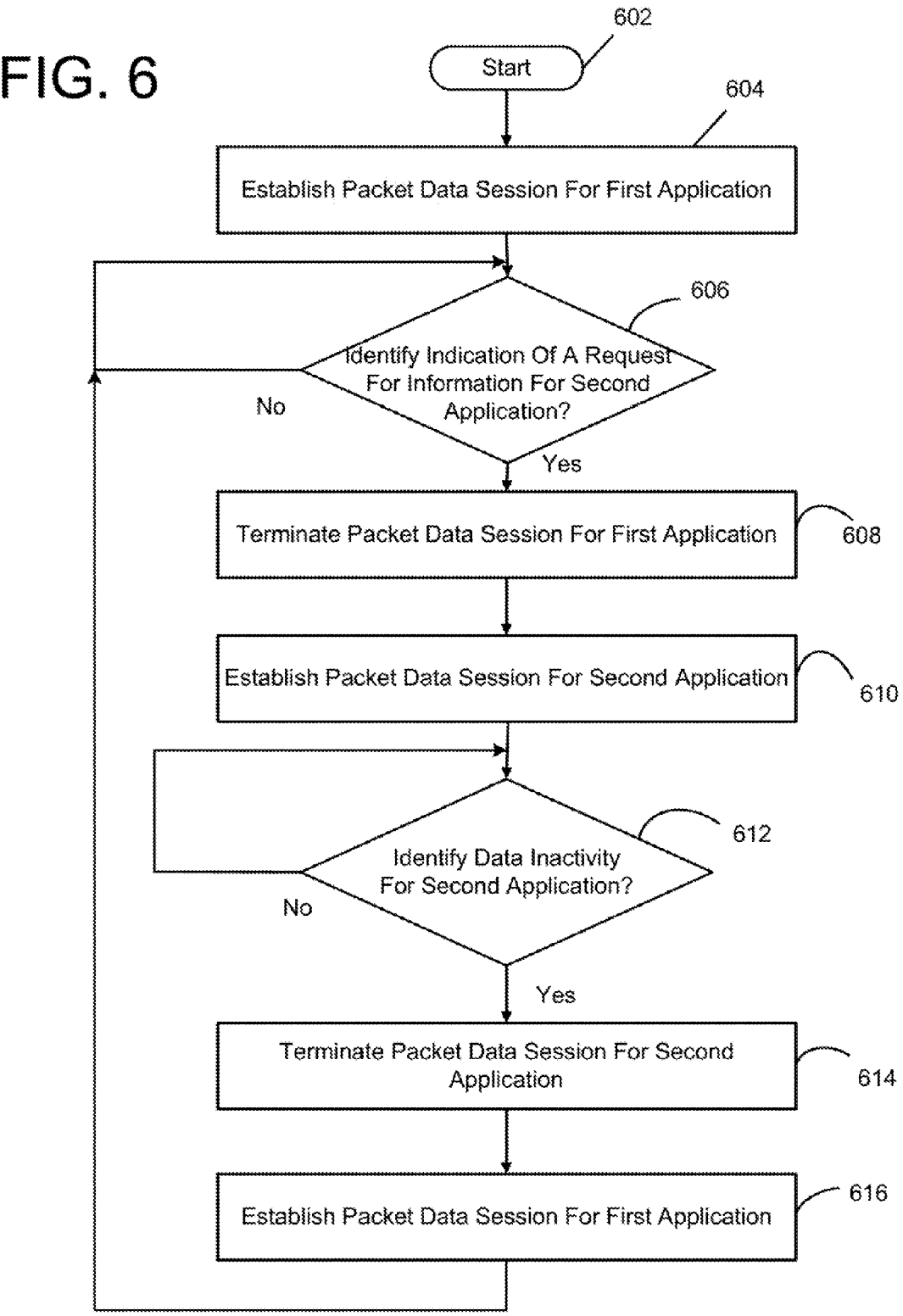
FIG. 6 is a flowchart of a general method for use in prioritizing assignment of a packet data session/tunnel connection for the plurality of applications of the mobile device.

FIG. 6 is a flowchart of a general method for use in prioritizing assignment of a packet data session/tunnel connection for the plurality of applications of the mobile device. Such technique may overcome prior art deficiencies and other related deficiencies in these and other environments. This method is especially useful when the mobile station operates in wireless networks that limit the number of simultaneous packet data sessions available to the mobile device. The method of FIG. 6 may be performed by mobile station 202 described in relation to FIGS. 1-2 and 4. In particular, the techniques described in relation to the flowchart may be performed by one or more processors of mobile station 202 along with its wireless transceiver. A computer program product which may embody the technique may include a computer readable medium having computer instructions stored therein which are executable by the one or more processors of the mobile station 202 for performing the technique.

In the present example to be described in relation to FIG. 6, the plurality of applications of the mobile station include at least a first (priority) application operative in connection with a first (priority) communication service and a second application operative in connection with a second communication service. In the present example, the first (priority) application is a data/message synchronization application for a data/message synchronization service (e.g. e-mail message delivery) and the second application is a Web browser application for a Web browsing service. In the present example, the number of packet data sessions which may be simultaneously maintained is equal to one (1).

Beginning at a start block 602 of FIG. 6, the mobile station causes a packet data session associated with the message synchronization application to be activated for accessing the message synchronization service (step 604 of FIG. 6). The packet data service may be a PDP context, where the mobile station causes an Activate PDP Context request for the message synchronization service to be sent to the wireless network. The mobile station is therefore enabled to receive "push" information associated with the message synchronization application.

In response to identifying an indication of a request for information via the Web browser application (step 606 of FIG. 6), however, the mobile station causes the packet data session associated with the message synchronization application to be deactivated (step 608 of FIG. 6). Here, the mobile station may cause a Deactivate PDP Context request to be sent to the wireless network. In addition, the mobile station causes a packet data session associated with the Web browser application to be activated for accessing the Web browser service (step 608 of FIG. 6). Here, the mobile station causes an Activate PDP Context request for the Web browsing service to be sent to the wireless network. It is noted that some wireless networks may automatically deactivate a packet data session upon activation of another packet data session if the maximum limit is reached; therefore, the sending of the Deactivate PDP Context request in step 608 may not be necessary. If no indication of requests for information associated with the Web browser application is identified in step 606, however, the packet data session for the message synchronization application is maintained with the wireless network.

The request for information in step 606 may be a user-initiated request for the information via the user interface of the mobile station. Alternatively, he request for information in step 606 may be an application-initiated request for the information (e.g. based on an expiration of a periodic timer for "polling" for information or the like).

Assuming the packet data session for the Web browser application has been activated, there will come a point in time where the user stops using the Web browser. The mobile device identifies whether communication inactivity associated with the Web browser application over a predetermined time period has continuously persisted (step 612 of FIG. 6). The mobile device may identify such communication inactivity in any suitable fashion. For example, after activating the packet data session associated with the second application, the mobile device may operate to initialize and run a timer, but then reinitialize the timer for each request for information for the second application. In this case, the communication inactivity associated with the second application is identified in response expiration of the timer. The timer may be reinitialized in response to detection of activity at the application itself, or activity through the packet data session.

In response to identifying communication inactivity associated with the Web browser application over the predetermined time period in step 612, the mobile station causes the packet data session associated with the Web browser application to be deactivated (step 614 of FIG. 6). The predetermined time period may be, for example, thirty (30) seconds, five (5) minutes, or any suitable amount of time. It is noted that the test in step 612 may also be triggered when the Web browser application is closed by the user. In step 612, the mobile station may cause a Deactivate PDP Context request for the Web browser service to be sent to the wireless network. Then, the mobile station causes a packet data session associated with the message synchronization application to be activated again with the wireless network for again accessing the message synchronization service (step 616 of FIG. 6). Again, it is noted that some wireless networks may automatically deactivate a packet data session upon activation of another packet data session if the maximum limit has been reached; therefore, the sending of the Deactivate PDP Context message in step 614 may not be necessary. Operation may repeat starting again at step 606.

As apparent, since the message synchronization service is kept active for most of the time (unless e.g. the user is continuously actively utilizing the other application(s)), "pushed" information associated with the message synchronization service may be received without fail despite the use of other applications in the mobile station.

As described in the example of FIG. 6, the number of simultaneous packet data sessions that were allowed by the network was limited to one (1). More generally, however, the techniques of the present disclosure may be viewed as especially useful when the number of simultaneous packet data sessions is limited to at least one less than the number of applications of the mobile station which may be in simultaneous (or substantially simultaneous) use. Here, if the number of simultaneous packet data sessions permitted is at least two (2), a preferred technique for operation is to continuously (or always) maintain the packet data session associated with the preferred or priority application, while sharing the limited available packet data session(s) amongst the other remaining applications.

Such alternative technique will now be described, where the number of allowable simultaneous packet data sessions is two (2) and the mobile station has at least three (3) applications which may be in use. The applications include at least a first (priority) application operative in connection with a first communication service, a second application operative in connection with a second communication service, and a third application operative in connection with a third communication service. In this technique, the mobile station causes a packet data session associated with the first application to be activated with the wireless network for accessing the first communication service, and also causes a packet data session associated with the second application to be activated with the wireless network for accessing the second communication service. The packet data sessions for both the first and the second applications are simultaneously maintained. In response to identifying an indication of a request for information via the third application, however, the mobile station causes the packet data session associated with the second application to be deactivated. In addition, the mobile station causes a packet data session associated with the third application to be activated with the wireless network for accessing the third communication service. Note that the packet data session for the first application is not deactivated during this process, but is rather maintained with the wireless network. Subsequently, in response to identifying an indication of a request for information via the second application, the mobile station causes the packet data session associated with the third application to be deactivated. In addition, the mobile station causes a packet data session associated with the second application to be activated with the wireless network for accessing the third communication service. Again, the packet data session for the first application is not deactivated during this process, but is rather maintained with the wireless network.

Again, "pushed" information associated with the first (e.g. message synchronization) service may be received without fail despite the use of other applications in the mobile station. If the number of simultaneous packet data sessions permitted is three (3) or more, the preferred method of operating is again to always maintain the packet data session associated with the preferred or priority application, while sharing the limited available packet data sessions amongst the other remaining applications, etc.

FIGS. 7-12 form a flowchart for a more detailed method for use in prioritizing assignment of a packet data session/tunnel connection for the plurality of applications of a mobile communication device. The technique in the flowchart of FIGS. 7-12 utilizes the general approach described in relation to FIG. 6, but provides more implementation details. The method of FIGS. 7-12 may be performed by mobile station 202 described in relation to FIGS. 1-2 and 4. In particular, the techniques described in relation to the flowchart may be performed by one or more processors of mobile station 202 along with its wireless transceiver. A computer program product which may embody the technique may include a computer readable medium having computer instructions stored therein which are executable by the one or more processors of the mobile station 202 for performing the technique. The technique as described in relation to FIGS. 7-12 may be performed by a session handling process or component in the software, which may be referred to simply as a session handler.

The detailed technique of FIGS. 7-12 utilizes a designation referred to as a "focus," which is a way of designating which application is in current use. If the user opens or otherwise uses an e-mail application, for example, the focus would be set to the e-mail application (i.e. the e-mail application "gains" focus). If the user switches to use of the Web browser application, the focus is changed to the Web browser application. If a timeout occurs due to data inactivity, the focus switches back to the e-mail application so that e-mail messages may be received. In the described technique of the flowchart, the priority application utilizes a packet data session associated with an APN referred to as "priority.net". In addition, the timer utilized in the technique is referred to as a tunnel focus timer.

Note that the maximum number of available simultaneous packet data sessions for a mobile device is not readily identifiable from network information, at least at the present time. The mobile device is therefore operative to determine this information during operation through interaction with the wireless network. In the present embodiment, the session handler first initializes a count to some predetermined number (referred to as a "watermark"). For example, the session handler may initialize the watermark to three (3). Subsequently, the mobile device performs adjustments to (e.g. decreases) the watermark based on network feedback. The network feedback may come in the form of responses to requests for packet data sessions. The responses may include acceptances or rejections having particular network reject codes. When a packet data session is already established, for example, and the mobile device attempts to activate another packet data session, the wireless network may reject the request along with a predetermined reject code (Insufficient Resources=26; Network Failure=38, Service Option Temporarily Out-Of-Order=34; and Unspecified Protocol Error=111).

Preferably, the mobile device determines and maintains a plurality of watermarks for each different network region, and (re)uses the corresponding watermark in the technique in response to identifying the particular region of operation.

Figure 7:
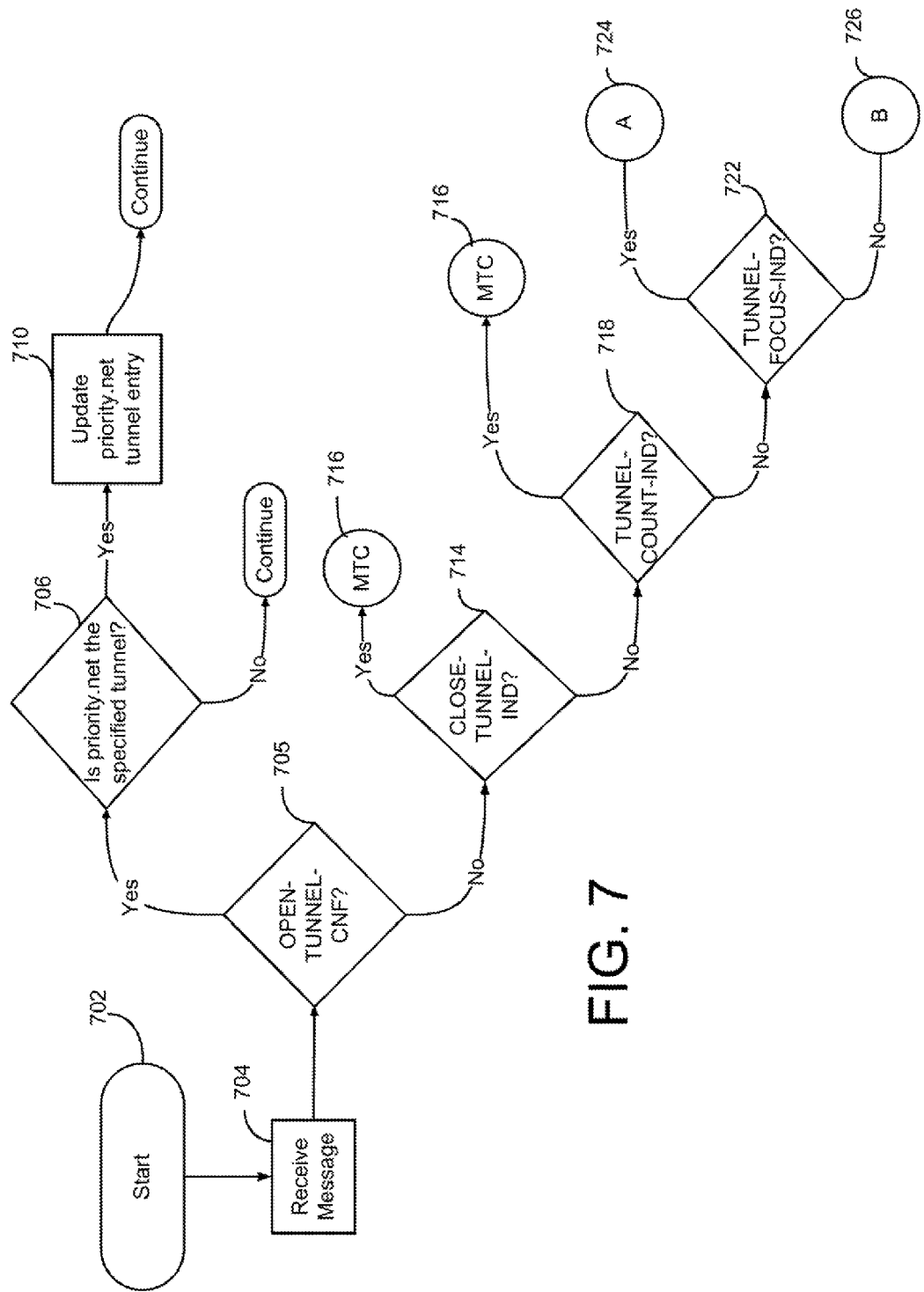

Beginning at a "start" block 702 of FIG. 7, the session handler receives and identifies a message (step 704 of FIG. 7) produced in the software by another routine(s). The message may contain certain indications. If the message confirms that a tunnel has been opened in an OPEN-TUNNEL-CNF indicator (as tested in step 705 of FIG. 7), the session handler proceeds to step 706 through the "Yes" branch. If the message does not confirm that a tunnel has been opened in step 705, then the session handler proceeds to step 714 through the "No" branch. If the priority tunnel (i.e. associated with APN of priority.net) is not the specified opened tunnel (as tested in step 706 of FIG. 7), then the method "continues" (returns to "start"). On the other hand, if the priority tunnel is the specified opened tunnel in step 706, the session handler causes the priority tunnel entry to be updated (step 710 of FIG. 7) and continues (returns to "start").

Taking the "No" branch from step 705, if the message indicates that a tunnel has been closed in a CLOSE-TUNNEL-IND indicator (as tested in step 714 of FIG. 7), then the session handler proceeds to call a "Maximum Tunnel Count" or "MTC" routine (i.e. through connector 716) through the "Yes" branch. If the message does not indicate that a tunnel has been closed in step 714, then the session handler proceeds to step 718 through the "No" branch. Next, if the message indicates that a tunnel count needs to be updated in a TUNNEL-COUNT-IND indicator (as tested in step 718 of FIG. 7), then the session handler proceeds to call the MTC routine (i.e. through connector 716 through the "Yes" branch. If the message does not indicate that the tunnel count needs to be updated in step 718, then the session handler proceeds to step 722 through the "No" branch. Next, if the message indicates that the tunnel focus needs to be updated in a TUNNEL-FOCUS-IND indicator (as tested in step 722 of FIG. 7), then the session handler proceeds to a connector A (i.e. connector 724) through the "Yes" branch. If the message indicates that the tunnel focus does not need to be updated in step 722, then the session handler proceeds to a connector B (i.e. connector 726) through the "No" branch.

FIG. 8 is the "Maximum Tunnel Count" or "MTC" routine associated with a call through connector 716. The session handler causes the maximum tunnel count to be updated (step 802 of FIG. 8) followed by a "Tunnel Prioritization Algorithm" or "TPA" routine (i.e. connector 804).

FIG. 9 is a continuation of processes through connector A (i.e. connector 724). First, the session handler updates the tunnel focus (step 902 of FIG. 9). Next, if the session handler identifies that the tunnel focus has changed (as tested in step 904 of FIG. 9), then the process proceeds to continue (i.e. return to "start") through the "No" branch from step 904. If the session handler fails to identify that the tunnel focus has changed in step 904 through the "Yes" branch, then the session handler identifies whether the tunnel focus timer is running (step 908 of FIG. 9). If the tunnel focus timer is running as tested in step 908, then the session handler proceeds to call the TPA routine (i.e. connector 804). If the tunnel focus timer is not running in step 908, then the session handler identifies whether the priority application is in focus (step 910 of FIG. 9). If the priority application is in focus in step 910, then the session handler proceeds to call the TPA routine (i.e. connector 804). If the priority application is not in focus in step 910, then the session handler sets the tunnel focus timer to a predetermined maximum keep-alive time (step 912 of FIG. 9) and calls the TPA routine (i.e. connector 804).

Figure 10:
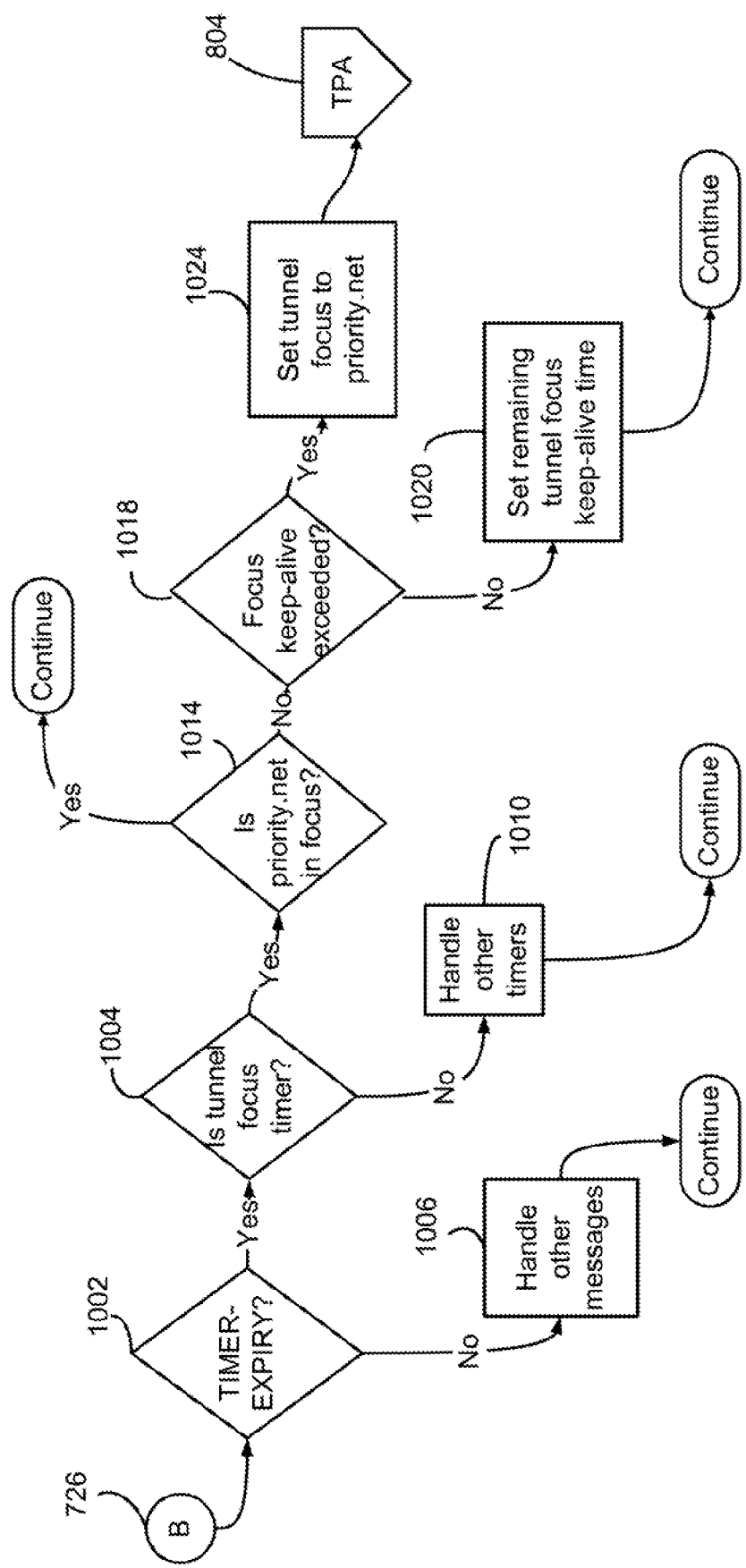

FIG. 10 is a continuation of processes through connector B (i.e. connector 726). The session handler identifies whether any timers have expired in TIMER-EXPIRY indicator (step 1002 of FIG. 10). If no timers have expired in step 1002, the session handler handles other types of messages (step 1006 of FIG. 10) and continues (returns to "start"). If a timer has expired in step 1002, the session handler identifies whether the expired timer is the tunnel focus timer (step 1004 of FIG. 10). If the expired timer is not the tunnel focus timer in step 1004, then the session handler handles the processing associated with other timer expirations (step 1010 of FIG. 10) and continues (returns to "start"). If the expired timer is the tunnel focus timer in step 1004, then the session handler identifies whether the priority application is currently in focus (step 1014 of FIG. 10). If the priority application is currently in focus in step 1014, then the process continues (returns to "start"). If the priority application is not currently in focus in step 1014, then the session handler identifies whether the focus keep-alive timer has been exceeded (step 1018 of FIG. 10). If not in step 1018, then the session handler sets the remaining tunnel focus keep-alive time (step 1020 of FIG. 10) and continues (return to "start"). If yes in step 1018, then the session handler sets the tunnel focus to the priority application (step 1024 of FIG. 10) and calls the TPA routine (connector 804).

Figure 11:
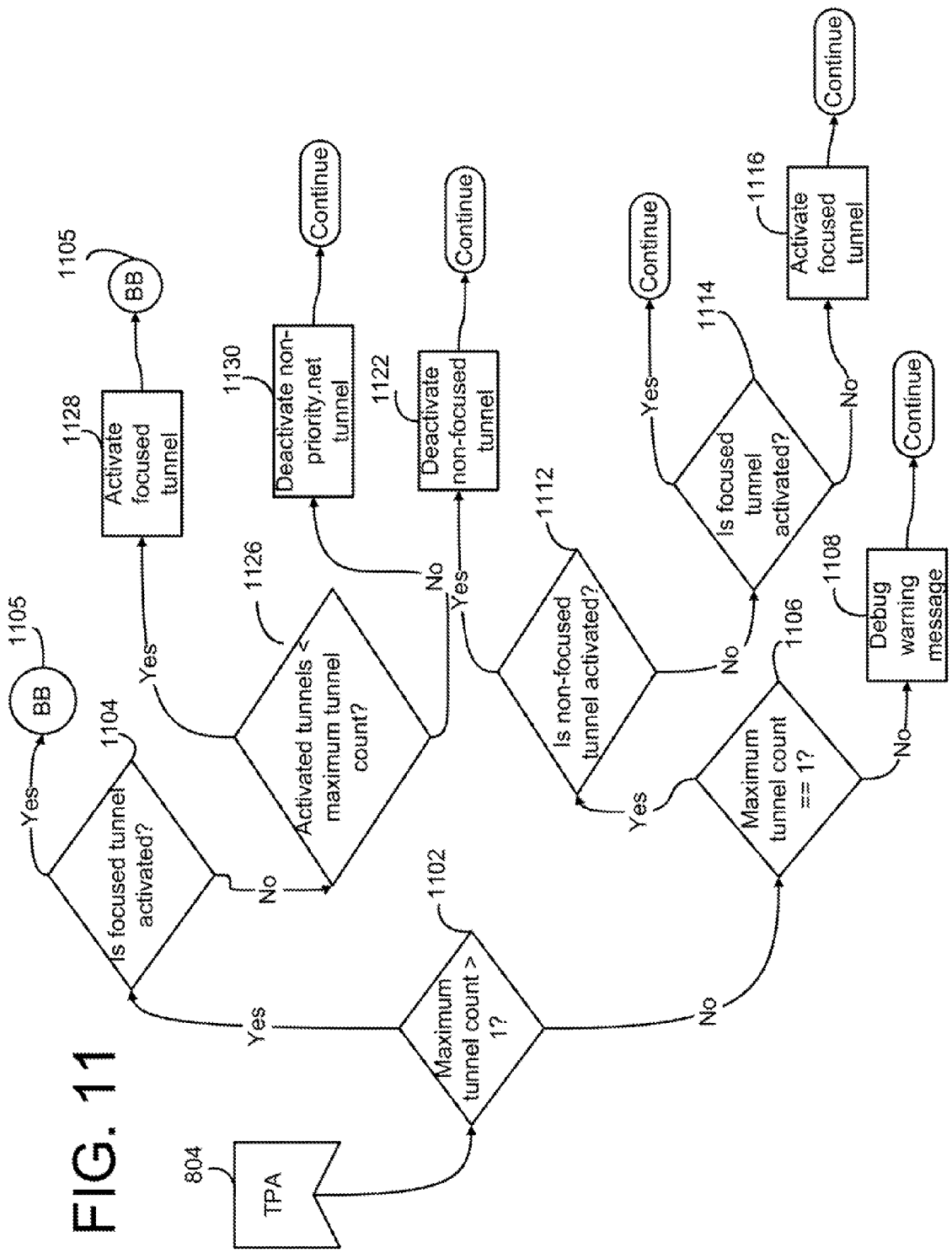

FIG. 11 is the "Tunnel Prioritization Algorithm" or "TPA" routine associated with a call through connector 804. The session handler identifies whether the maximum tunnel count is greater than 1 (step 1102 of FIG. 11). If yes in step 1102, then the session handler identifies whether the focused tunnel is activated (step 1104 of FIG. 11). If yes in step 1104, then the session handler calls the BB routine (i.e. connector 1105). If not in step 1104, then the session handler identifies whether the number of currently activated tunnels is less than the maximum tunnel count (step 1126 of FIG. 11). If yes in step 1126, the session handler activates the focused tunnel (step 1128 of FIG. 11) and calls the BB routine (i.e. connector 1105). If not in step 1126, the session handler deactivates the non-priority tunnel (i.e. APN not associated with priority.net) and continues (returns to "start"). Continued from the "No" branch from step 1102, the session handler identifies whether the maximum tunnel count is exactly equal to 1 (step 1106 of FIG. 11). If no in step 1106, an error condition is present and a debug warning message is displayed (step 1108 of FIG. 10) and the process continues (returns to "start"). If yes in step 1106, the session handler identifies if the non-focused tunnel is activated (step 1112 of FIG. 11). If not in step 1112, the session handler identifies whether the focused tunnel is activated (step 1114 of FIG. 11). If yes in step 1114, the session handler does nothing and merely continues (returns to "start"). If no in step 1114, the session handler activates the focused tunnel (step 1116 of FIG. 11) and continues (returns to "start"). Continuing from the "Yes" branch from step 1112, the session handler deactivates the non-focused tunnel (step 1122 of FIG. 11) and continues (returns to "start").

Figure 12:
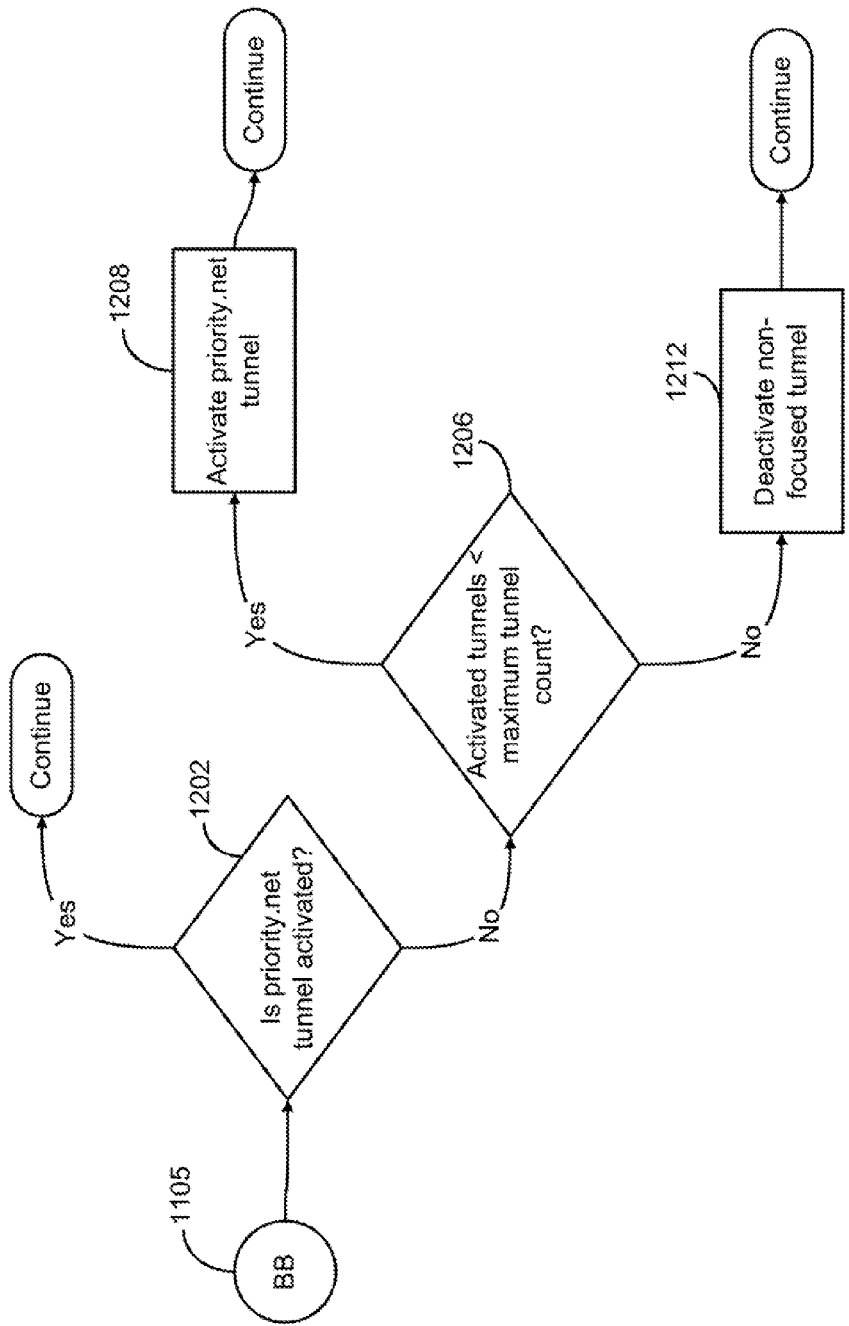

FIG. 12 is the BB routine associated with the call through connector 1105. The session handler identifies whether the priority tunnel is activated (step 1202 of FIG. 12). If yes in step 1202, the session handler does nothing and merely continues (returns to "start"). If no in step 1202, the session handler identifies whether the number of activated tunnels is less than the maximum tunnel count (step 1206 of FIG. 12). If yes in step 1206, the session hander activates the priority tunnel (step 1208 of FIG. 12) and continues (returns to "start"). If no in step 1206, the session handler deactivates the non-focused tunnel (step 1212 of FIG. 12) and continues (returns to "start").

Thus, methods and apparatus for prioritizing assignment of a packet data session for a plurality of applications of a mobile communication device, especially in wireless networks that limit the number of simultaneous packet data sessions available to the mobile device, have been described. The plurality of applications include at least a first (priority) application operative in connection with a first (priority) communication service and a second application operative in connection with a second communication service. The first (priority) service may be or include a "push" type data or message synchronization service. During operation, the mobile device causes a packet data session associated with the first (priority) application to be activated for accessing the first (priority) service. In response to identifying an indication of a request for information via the second application, the mobile device causes the packet data session associated with the first (priority) application to be deactivated, and causes a packet data session associated with the second application to be activated for accessing the second service. Subsequently, in response to identifying communication inactivity associated with the second application over a predetermined time period, the mobile device causes the packet data session associated with the second application to be deactivated, and causes a packet data session associated with the first (priority) application to be activated again with the wireless network for again accessing the first (priority) service.

Thus, communications associated with the priority service (or other) may be provided without fail despite the use of other applications in the mobile device.

The above-described embodiments of the present disclosure are intended to be examples only. Similar or the same problems may exist in different environments (e.g. in a CDMA environment, a tunnel refers to a Point-to-Point Protocol "PPP" session; in an WLAN environment, a tunnel is referred to as a network connection; and in virtual private network "VPN" environments, a tunnel refers to a VPN tunnel). It is also noted that the wireless network need not limit the number of packet data sessions in order for the present techniques to be utilized; e.g. the mobile device itself may limit the number of packet data sessions in order to conserve network resources and utilize the inventive techniques for that reason. Those of skill in the art may effect alterations, modifications and variations to the particular embodiments without departing from the scope of the application. The invention described herein in the recited claims intends to cover and embrace all suitable changes in technology.

What is claimed is:

1. A method for use in a mobile communication device for prioritizing use of packet data sessions, the method comprising:
    causing a packet data protocol (PDP) associated with a priority application to be established with a wireless network for accessing a first communication service;
    causing a PDP context associated with a second application to be established with the wireless network for accessing a second communication service;
    in response to identifying an indication of a request for information via a third application:
    causing the PDP context associated with the second application to be terminated; and
    causing a PDP context associated with the third application to be established with the wireless network for accessing a third communication service.

2. The method of claim 1, wherein prior to terminating the PDP context associated with the second application, the PDP contexts for both the priority application and the second application are maintained with the wireless network.

3. The method of claim 1, further comprising:
    in response to identifying an indication of a request for information via the second application:
    causing the PDP context associated with the third application to be terminated; and
    causing a PDP context associated with the second application to be reestablished with the wireless network for accessing the second communication service.

4. The method of claim 1, wherein the PDP contexts associated with both the priority application and the third application are maintained with the wireless network after the PDP context associated with the second application is terminated and the PDP context associated with the third application is established.

5. The method of claim 3, wherein the PDP contexts associated with both the priority application and the second application are maintained with the wireless network after the PDP context associated with the third application is terminated and the PDP context associated with the second application is established.

6. The method of claim 1, wherein the number of PDP contexts which may be maintained in the wireless network for the mobile device is limited to at least one less than the number of applications of the mobile device which are running.

7. The method of claim 1, wherein the priority application comprises a data or message synchronization application.

8. A mobile communication device, comprising: one or more processors;
    a wireless transceiver coupled to the one or more processors and operative for communications in a wireless network;
    the one or more processors being operative to:
    cause a packet data protocol (PDP) context associated with a priority application of the mobile device to be established with the wireless network, with use of the wireless transceiver, for accessing a first communication service;
    cause a PDP context associated with a second application of the mobile device to be established with the wireless communication network, with use of the wireless transceiver, for a second communication service;
    in response to identifying an indication of a request for information via a third application of the mobile device;
    cause the PDP context associated with the second application to be terminated; and
    cause a PDP context associated with the third application t:o be established with the wireless network, with use: of the wireless transceiver, for accessing the third communication service.

9. The mobile communication device of claim 8, wherein the one or more processors are further configured to:
    in response to identifying an indication of a request for information via the second application:
    cause the PDP context associated with the third application to be terminated; and
    cause a PDP context associated with the second application to be reestablished with the wireless network for accessing the second communication service.

10. The mobile communication device of claim 9, wherein the PDP contexts for both the priority application and the second application are maintained with the wireless network.

11. The mobile communication device of claim 9, wherein the PDP contexts associated with both the priority application and the third application are maintained with the wireless communication network after the PDP context associated with the second application is terminated and the PDP context associated with the third application is established.

12. The mobile communication device of claim 9, wherein the PDP contexts associated with both the priority application and the second application are maintained with the wireless communication network after the PDP context associated with the third application is terminated and the PDP context associated with the second application is established.

13. The mobile communication device of claim 9, wherein the number of PDP contexts which may be maintained in the wireless communication network for the mobile communication device is limited to at least one less than the number of applications of the mobile communication device which are running.

14. The mobile communication device of claim 9, wherein the priority application comprises a data or message synchronization application.

15. A computer program product, comprising:
a non-transitory computer readable medium;
computer instructions stored in the non-transitory computer readable medium;
the computer instructions being executable by one or more processors of a mobile device for use in prioritizing use of packet data sessions, the computer instructions being further executable for:
causing a packet data protocol (PDP) associated with a priority application of the mobile device to be established with: a wireless network for accessing a first communication service;
causing a PDP context associated with the second application of the mobile device to be established with the wireless network for accessing a second communication service;
in response to identifying an indication of a request for information via a third application of the mobile device:
causing the PDP context associated with the second application to be terminated; and
causing a PDP context associated with a third application of the mobile device to be established with the wireless network for accessing a third communication service.

16. The computer program product of claim 15, wherein the computer instructions are further executable for:
in response to identifying an indication of a request for information via the second application:
causing the PDP context associated with the third application to be terminated; and
causing a PDP context associated with the second application to be established with the wireless communication network for accessing the second communication service.

17. The computer program product of claim 15, wherein the PDP contexts associated with both the priority application and the third application are maintained with the wireless network after the PDP context associated with the second application is terminated and the PDP context associated with the third application is established.

18. The computer program product of claim 15, wherein the PDP contexts associated with both the priority application and the second application are maintained with the wireless network after the PDP context associated with the third application is terminated and the PDP context associated with the second application is established.

* * * * *